United States Patent [19]

Moore

[11] Patent Number: 5,000,519
[45] Date of Patent: Mar. 19, 1991

[54] TOWED VEHICLE EMERGENCY BRAKE CONTROL SYSTEM

[76] Inventor: John Moore, 39 Brenlyn Ct., Hamilton, Ontario, L9C 4N8, Canada

[21] Appl. No.: 441,013

[22] Filed: Nov. 24, 1989

[51] Int. Cl.[5] ............................................. B60T 13/00
[52] U.S. Cl. ..................................... 303/7; 188/3 R; 188/112 R; 188/158; 303/18; 303/20; 303/13
[58] Field of Search .................. 303/7, 20, 18, 13, 15, 303/101; 188/3 R, 3 H, 158, 163, 164, 165, 112 R, 112 A

[56] References Cited

U.S. PATENT DOCUMENTS

| | | | |
|---|---|---|---|
| 1,666,748 | 4/1928 | Mickley | 303/20 |
| 2,377,318 | 6/1945 | Born et al. | 188/3 R |
| 3,034,598 | 5/1962 | LaFaye . | |
| 3,048,976 | 8/1962 | Grigsby et al. . | |
| 3,054,476 | 9/1962 | Corrigan, Jr. | 188/3 R |
| 3,423,135 | 1/1969 | Beltramo . | |
| 3,480,838 | 11/1969 | Meir . | |
| 3,486,799 | 12/1969 | Greentree | 188/3 R X |
| 3,538,392 | 11/1970 | Carmichael et al. . | |
| 3,566,987 | 3/1971 | Franzel | 188/112 A |
| 3,574,414 | 4/1971 | Jacob . | |
| 3,738,710 | 6/1973 | Pokrinchak et al. . | |
| 3,758,165 | 9/1973 | Savelli | 188/112 A X |
| 3,780,832 | 12/1973 | Marshall . | |
| 3,840,276 | 10/1974 | Jubenville . | |
| 3,886,339 | 5/1975 | Jubenville | 188/112 A X |
| 3,897,979 | 8/1975 | Vangalis et al. | 188/112 X |
| 3,909,075 | 9/1975 | Pittet, Jr. et al. . | |
| 3,953,084 | 4/1976 | Pittet, Jr. et al. . | |
| 3,967,863 | 7/1976 | Tomecek et al. . | |
| 3,981,542 | 9/1976 | Abrams et al. . | |
| 3,993,362 | 11/1976 | Kamins et al. . | |
| 4,023,863 | 5/1977 | Sisson et al. . | |
| 4,023,864 | 5/1977 | Lang et al. | 303/7 X |
| 4,196,936 | 4/1980 | Snyder | 188/112 A X |
| 4,254,998 | 3/1981 | Marshall et al. | 188/112 A X |
| 4,398,252 | 8/1983 | Frait | 188/3 R X |
| 4,533,185 | 8/1985 | Krause | 303/20 X |
| 4,538,859 | 9/1985 | Russell . | |
| 4,721,344 | 1/1988 | Frait et al. | 303/20 |

FOREIGN PATENT DOCUMENTS 1354727  5/1974  United Kingdom .

Primary Examiner—Douglas C. Butler
Attorney, Agent, or Firm—Rogers & Scott

[57] ABSTRACT

Emergency brake control system for towed vehicles comprising brake regulation device and a plurality of switches whereby a discrete braking force may be selected and applied to the towed vehicle brakes upon actuation by the user of one of the switches and whereby the braking force is maintained without any intervention by the user.

8 Claims, 7 Drawing Sheets

TOWED VEHICLE EMERGENCY BRAKE CONTROL SYSTEM

FIELD OF THE INVENTION

This invention relates to the control of towed vehicle brakes in emergency situations which require a selection of the magnitude of the braking force to be applied.

BACKGROUND OF THE INVENTION

It will be appreciated that the brakes of a towed vehicle are normally operable by controls which actuate automatically upon actuation of the brakes of the tow vehicle. Preferably, the brake controls are adjusted to decelerate the towed vehicle a little sooner than the tow vehicle so that the towed vehicle will drag somewhat and not over-run or jackknife behind the tow vehicle.

In a jackknifing situation, where a towed vehicle is effectively heading in a different direction from the tow vehicle, and dangerously applying a transverse force thereto more drastic control measures are required. A recommended procedure is to slow down the towed vehicle or trailer by actuating only the brakes of the trailer. In some cases, it is even recommended to also accelerate the tow vehicle ahead of the trailer so that the trailer can be aligned to follow directly behind. To achieve such control, towed vehicle brakes are often provided with manual override systems whereby the towed vehicle brakes may be actuated independently of the tow vehicle brakes.

Such manual override systems require a "hands-on" operation whereby release of the associated operating lever results in deactivation of the trailer brakes, thereby allowing normal operation of the vehicle to resume. The magnitude of the braking force applied to the towed vehicle brakes is dependent on the relative position of the operating lever. Towed vehicle brake controls made by Kelsey Hayes Co. and Tekonsha Engineering Co. are typical of this art.

It will be appreciated that it is difficult, even for an experienced driver, to access and control the operating lever, and at the same time to accelerate and steer the tow vehicle. Where the driver is thrown from side to side, as in a jackknifing situation, or where the driver is partially disabled because of physical discomfort or a heart attack, gaining control of a swaying trailer is even more difficult and failure has disastrous consequences. Clearly, there is a need for improved brake control systems for use in emergency situations.

Another problem which arises in the electrically operated towed vehicle brake control made by Tekonsha Engineering Co., as exemplified by the apparatus described in U.S. Pat. Nos. 3,909,075 and 3,967,863, is that the towed vehicle brakes are disabled when the tow vehicle brake light circuit is inoperative. The apparatus is designed to avoid overheating of the brake control circuit, but this has the undesirable consequence that mere faults such as a blown fuse, loose connection, broken wire and the like will cause the towed vehicle brakes to fail.

An object of this invention is to provide an emergency brake control system for towed vehicles whereby the abovementioned problems associated with conventional towed vehicle brake controls are at least partially redressed.

SUMMARY OF THE INVENTION

In accordance with this invention, there is provided an emergency brake control system for towed vehicles whereby a discrete braking force may be selected and applied to the towed vehicle brakes upon actuation by the user of a switch and whereby said braking force is maintained without any intervention by the user.

BRIEF DESCRIPTION OF THE DRAWINGS

Embodiments of the invention are described below with reference to the accompanying drawings, in which.

DESCRIPTION OF THE PREFERRED EMBODIMENT

Figure 1:
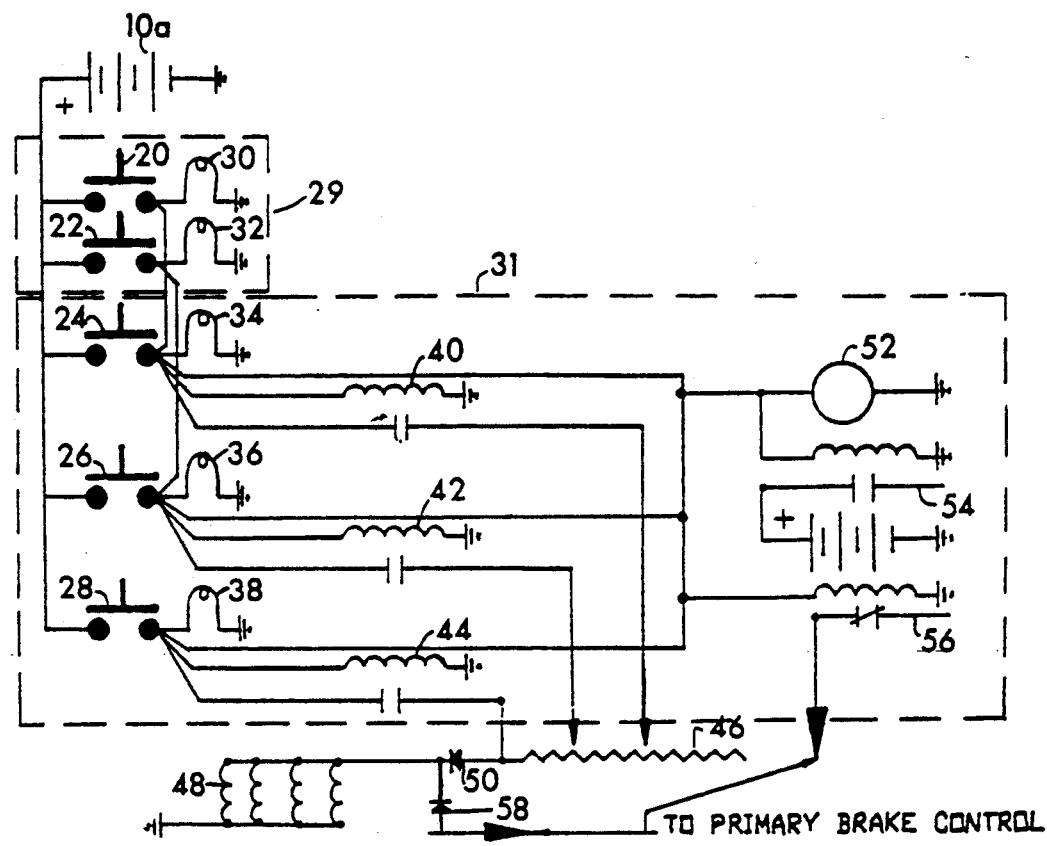
FIG. 1 is a schematic diagram illustrating a first embodiment of an electrically operated auxiliary brake control system according to the invention which incorporates switches, relays and a variably tapped resistor to regulate electrical current delivered to the towed vehicle brakes.

The invention provides an auxiliary brake control system for use in association with a primary brake control system of a towed vehicle, and which in the case of electrical brake systems, regulates the supply of electrical current to the brakes of the towed vehicle. Such primary brake control systems are infinitely adjustable and well known in the art and therefore are not described in this specification in any detail; they may include a variety of sensor means for sensing acceleration of the towed vehicle or may include sensing means to sense swaying of the towed vehicle or trailer. Ultimately, such brake control systems control the supply of electrical current to the towed vehicle brakes and thereby determine the magnitude of the braking force which is applied to the towed vehicle wheels.

The auxiliary brake control system of the invention may be actuated by a driver or passenger to override the primary brake control system, particularly in an emergency situation. In the embodiments of the invention described with reference to the accompanying drawings, the magnitude of the braking force applied to the wheels of a towed vehicle is determined by one of three electrical circuits selected by actuating a respective toggle switch connected to a source of brake operating electrical current, in most cases a 12 (twelve) volt vehicle battery generally indicated in the drawings by numeral 10a.

Referring now to FIG. 1, it will be seen that in this system five switches 20, 22, 24, 26, 28 are provided. Two of the switches, 20 and 22, are located on the gear shift 29 of the tow vehicle and the other three, 24, 26, 28, are provided on a console 31 mounted on the dash board of the tow vehicle, or mounted between the driver's seat and the passenger seat so as to be accessible by a passenger as well as the driver. Preferably, the switches are of the push-on, push-off type having contacts rated at three amps, and may for example comprise ARCHER (trade mark of Tandy Corporation) switches Model No. 275-1565.

Switches 24, 26, and 28 are operable to close respective circuits whereby discrete low, medium and high braking forces respectively are applied to the towed vehicle or trailer wheels. Switches 20 and 22 are wired in parallel with switches 24, 26 respectively and are operable to close the aforementioned low and medium braking force circuits. Visual alarm means 30, 32, 34, 36, 38 are wired in series with respective switches 20, 22, 24, 26, 28 to give a visual indication of whether the electrical circuit comprising the associated switch is closed. The visual alarm means may take the form of a mini lamp and may for example comprise ARCHER (trade mark of Tandy Corporation) mini lamp Model No. 272-1099 rated for 12 volts and 60ma.

Each of the low, medium, and high braking force circuits includes a respective relay 40, 42, 44 electrically connected in series with the associated switch at one end and at the other end to a respective preselected location on a variably tapped resistor 46. Together, the variably tapped resistor 46 and the associated relays comprise electrical current regulation means whereby the total current supply to the towed vehicle brakes is determined. In FIG. 1, the towed vehicle brakes comprise operating solenoids indicated generally by numeral 48 and electrically connected in series with the variably tapped resistor 46 via a rectifying diode 50 provided to suppress any back feeds of voltage.

Each of the switches also closes an additional circuit which includes an audible alarm 52, a normally open relay 54 adapted to close and transmit a supply of electrical current to the towed vehicle brake lights upon actuation of one of the switches, and a normally closed relay 56 adapted to open and interrupt the supply of electrical current to the primary brake control system (not shown).

The alarm may include any number of buzzers and could include for example an ARCHER (trade mark of Tandy Corporation) alarm Model No 273-055 rated for 12 volts. The relays 40, 42, 44, 54 will preferably be 12 volt relays rated for 10 amps and may for example include ARCHER (trade mark of Tandy Corporation) relays Model No. 275-248. The relays used in the electrical current regulations means may of course be substituted with relays rated for a higher amperage commensurate with the particular brake solenoid in use.

The variably tapped resistor 46 may be selected from a variety of commercially available resistors and typically will have a maximum resistance in the order of 5 ohms and could be for example be a WARD LEONARD (trade mark of Ward Leonard Electric Co., Inc.) resistor.

Figure 2:
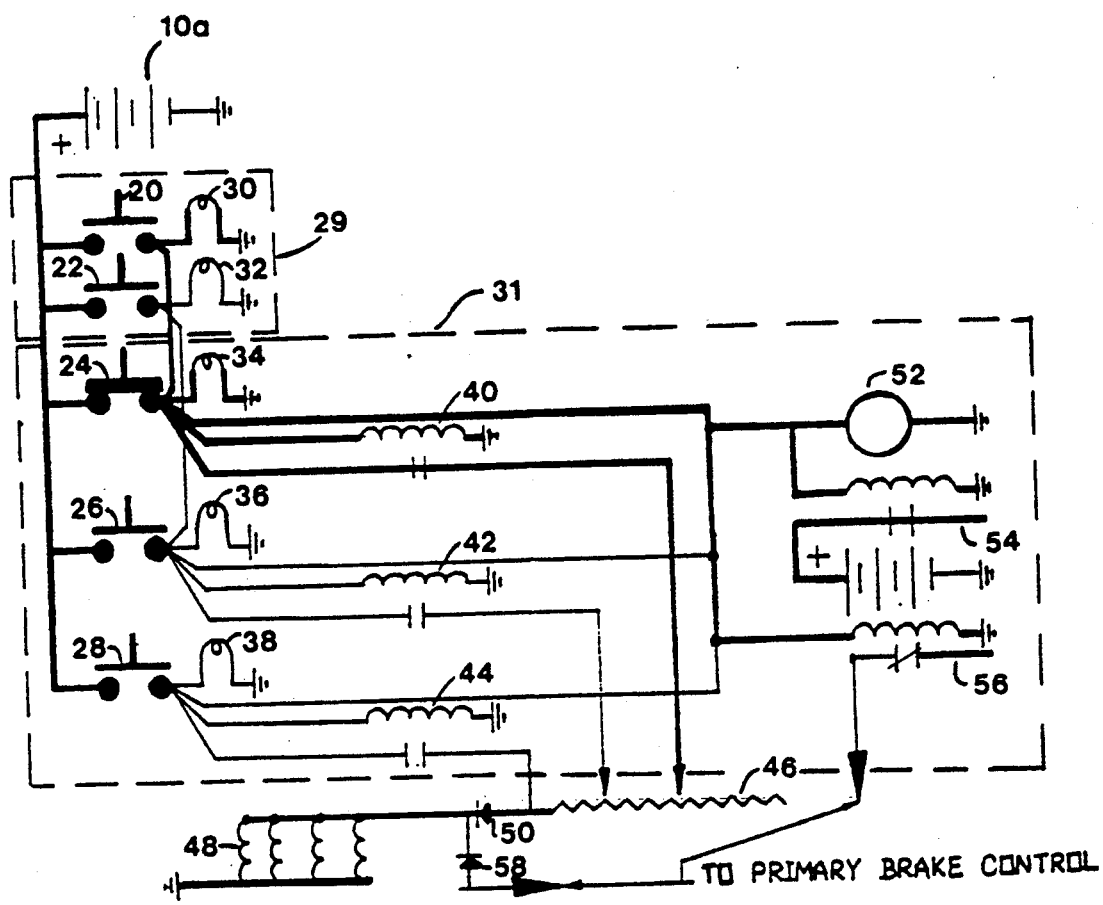
FIG. 2 is a schematic diagram showing the embodiment of FIG. 1 in which the electrical circuit associated with a low braking force is closed by a switch provided on an emergency brake console, the circuit being indicated by a thickened line.

During normal operation, actuation of switch 20 or 22 on the gear shift 29 by the driver will apply respectively either a low or medium braking force to the towed vehicle wheels. However, a towed vehicle which is swaying or exhibiting a tendency to cause the vehicle to jackknife may also be brought under control by either the driver of the vehicle or a passenger, if the driver is disabled, by selecting one of the switches 24, 26, 28 on the console 31 so as to close the electrical circuit to the trailer brakes appropriate to the prevailing conditions. Thus, as indicated by the thickened line of FIG. 2, switch 24 has been actuated to close the circuit associated with a maximum resistance on resistor 46 so as to deliver a preselected minimum current, of for example 4.5 amps, to the brake solenoids 48. A low braking force is thus applied to the towed vehicle wheels. It will be understood that this braking force will be maintained for the entire duration that the switch 24 is depressed, and that the hand of the driver or passenger who operated the switch will be free to steer the tow vehicle and bring the vehicle under control.

Figure 3:
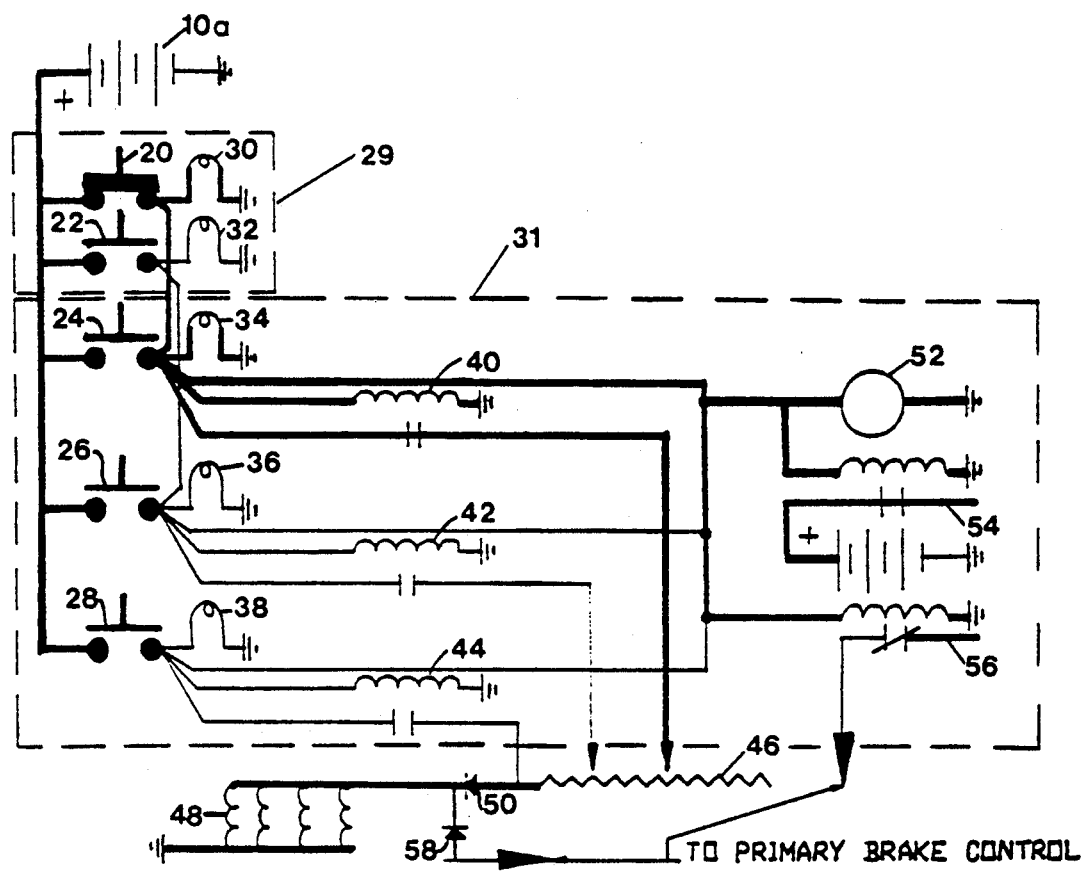
FIG. 3 is a schematic diagram showing the embodiment of FIG. 1 in which the electrical circuit associated with a low braking force is closed by a switch provided on the tow vehicle gearshift, the circuit being indicated by a thickened line.

A similar result is produced by actuating switch 20 provided on the gear shift 29, as illustrated in FIG. 3.

Figure 4:
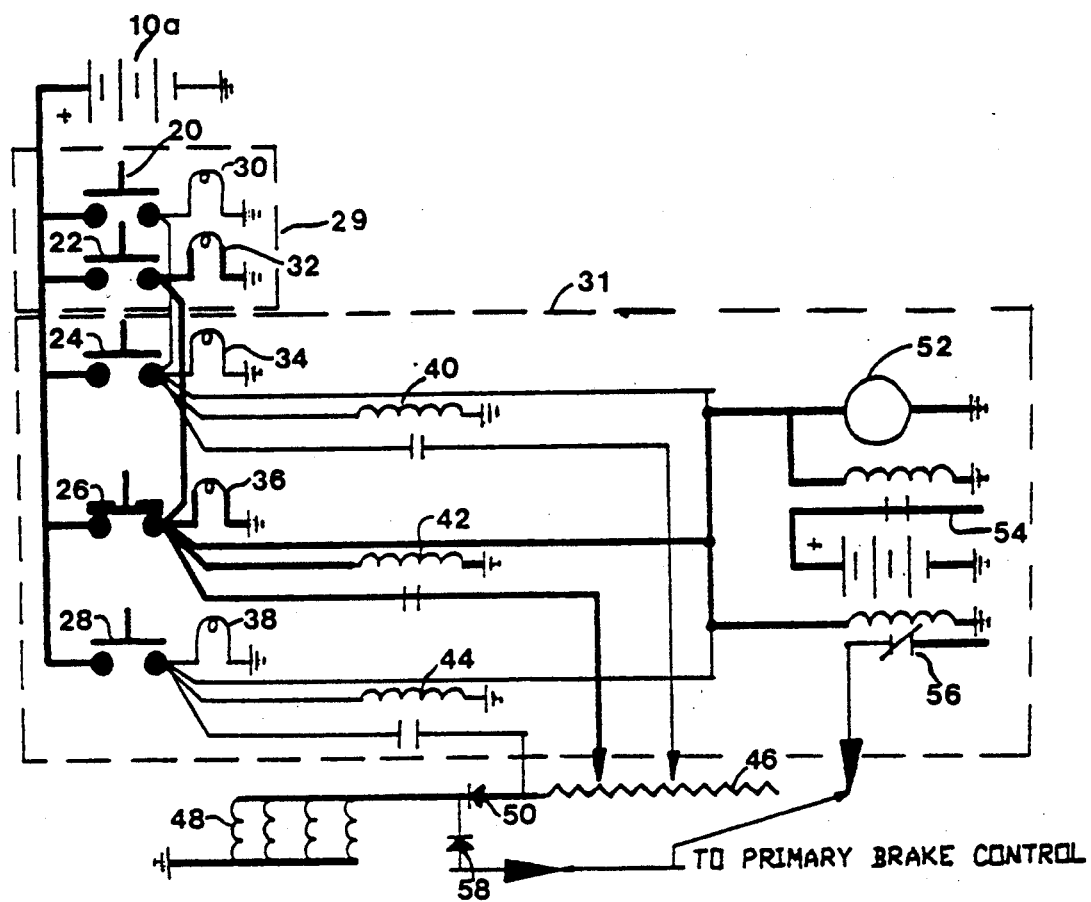
FIG. 4 is a schematic diagram showing the embodiment of FIG. 1 in which the electrical circuit associated with a medium braking force is closed and indicated by a thickened line.

If a medium braking force is required, switch 22 or 26 may be actuated so as to close the electrical circuit between the power supply and an intermediate portion of the resistor 46 whereby a greater current, of for example 6 amps, is delivered to the brake solenoid 48. The electrical circuit closed by switch 26 is indicated by the thickened line of FIG. 4.

Figure 5:
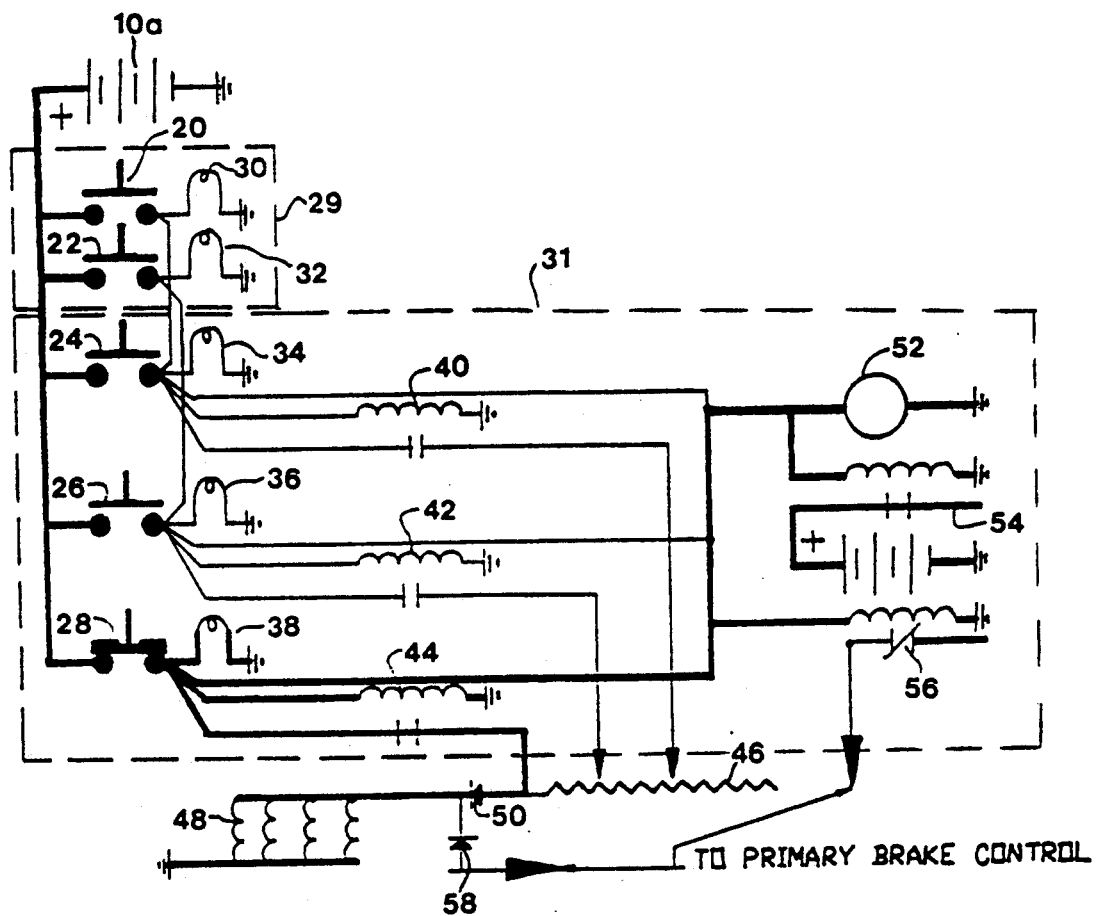
FIG. 5 is a schematic diagram showing the embodiment of FIG. 1 in which the electrical circuit associated with a high braking force is closed and indicated by a thickened line.

For a still greater braking force, switch 28 is actuated thereby closing the circuit between the supply of electrical current and the brake solenoid directly so as to bypass the resistor 46 and deliver a maximum current to the brake solenoid 48 of approximately 8.5 amps. The electrical circuit closed upon actuation of the switch 28, whereby a high braking force is applied to the towed vehicle brakes, is indicated by the thickened line of FIG. 5.

It will be understood that whenever a switch is actuated to close an electrical circuit between the supply of electrical current and the brake solenoids, the visual and audible alarms are actuated thereby alerting the occupants of the vehicle that the auxiliary brake control system is in operation and allowing such occupants to quickly ascertain whether a low, medium or high braking force is being applied to the towed vehicle wheels.

The magnitude of the braking force associated with each switch may be adjusted by selecting the location of the respective tap on the variable resistor 46 to which the switch is electrically connected in accordance with anticipated prevailing conditions including, for example, the load of the towed vehicle or trailer and road conditions. Typically, the resistance required for a low, medium and high braking power will be 2.2 ohms, 1.7 ohms, and 0 ohms respectively, so as to deliver currents of 4.5 amps, 6.5 amps, and 8.5 amps respectively to the brake solenoids. In order that the braking force applied be consistent and certain, the primary brake control system is disabled by the relay 56 and an isolating diode 58 is provided in the circuit between the brake solenoids 48 and the primary brake control system (not shown).

The auxiliary brake control system according to the invention is within fingers reach thus allowing any occupant in the tow vehicle to apply a preselected braking force to the towed vehicle wheels and to have this force maintained without any intervention so that hands are free to steer the vehicle. Conveniently, the actuating switches 24, 26 and 28 may be provided in two sets so as to be readily accessible by both the driver and a passenger.

Figure 6:
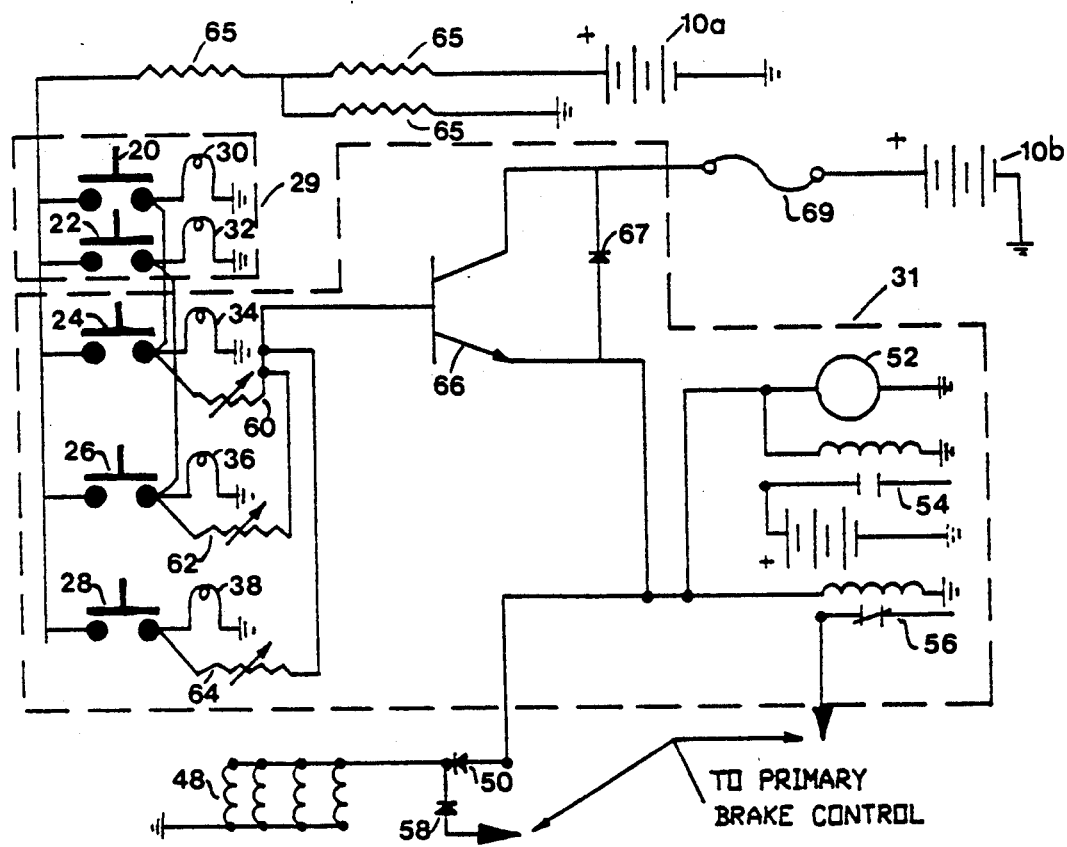
FIG. 6 is a schematic diagram illustrating a second embodiment of the invention in which adjustable potentiometers and a transistor comprise the electrical current regulation means.
Figure 7:
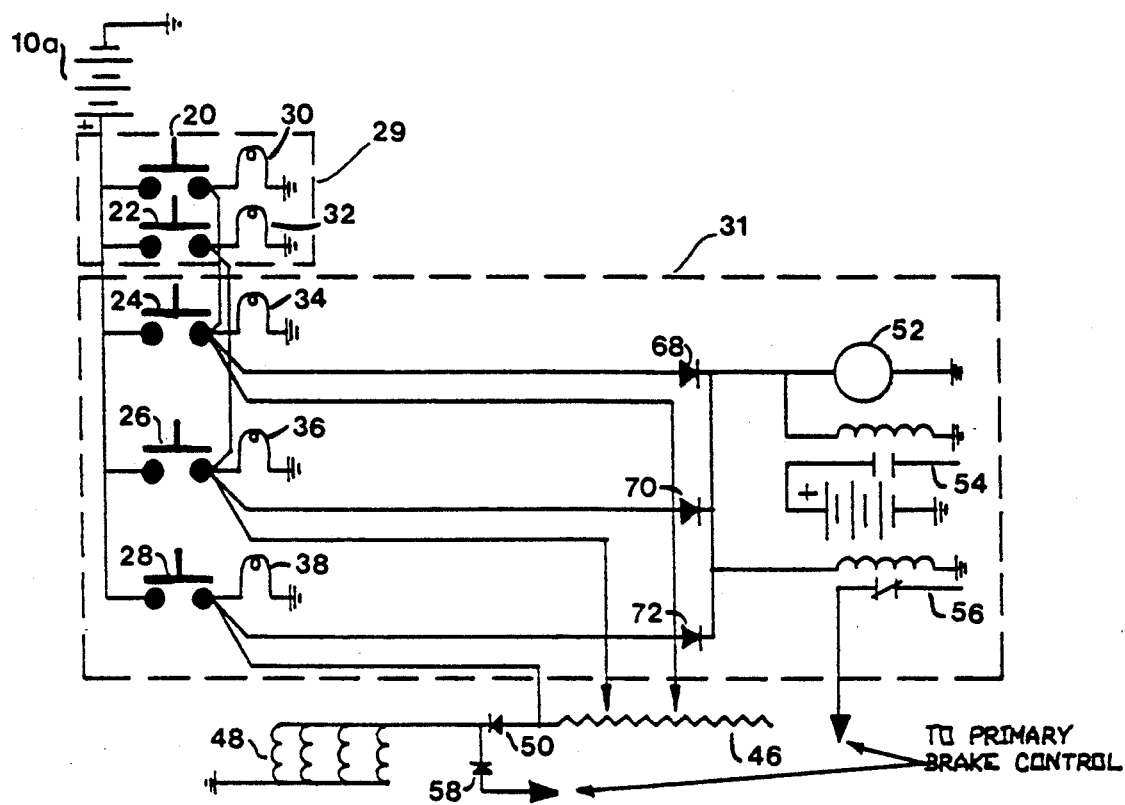
FIG. 7 is a schematic diagram illustrating a third embodiment of the invention in which the electrical current regulation means comprise a variably tapped resistor directly connected to control switches.

Alternative embodiments of the invention are illustrated in FIGS. 6 and 7 where corresponding components have been numbered with the same numerals. In FIG. 6, the electrical current regulation means is comprised of three adjustable potentiometers 60, 62, 64 each associated with respective switches (20, 24), (22, 26), and 28 connected to the vehicle battery 10a via three load resistors 65 each rated at 500 ohms and arranged to provide a potential difference to the switches. The potentiometers are rated at twenty K ohms and may for example include CLAROSTAT Type 53C3 2500 Model No. RV4NAYSD 252A (trade mark of Clarostat Mfg. Co. Inc., Dover, N.H.). A power transistor 66 is electrically connected to the potentiometers and the brake solenoids and is controlled by the potential applied to it to in turn control the value of the current delivered to the brakes. In the circuit of FIG. 6, the transistor is of the npn type and rated at sixteen amps and may for example comprise a DARLINGTON Model No. ECG249 (trade mark of Philips Export N.V.).

A surge suppressor in the form of a diode 67 is connected between the transistor 66 and a twenty amp fuse or reset switch 69 (external to the control and not incorporated in the control design) connected to the battery generally indicated by numeral 10b. Alternatively, a reset switch external to the control unit may be substituted for the fuse 69. The battery 10a associated with the switches and the battery 10b associated with the transistor may physically comprise the same source of electrical current and are drawn separately only for convenience and clarity in drafting.

In FIG. 7, the electrical current regulation means simply comprises a variably tapped resistor 46. The associated switches 20, 22, 24, 26, 28 are rated at 20 amps and may for example include ARCHER (trade mark of Tandy Corporation) Model No. 275-8058A. Rectifying diodes 68, 70, 72 are provided in series in each of the circuits closed by the switches with the audible alarm 52, the trailer brake light relay 54 and the primary brake control system relay 56, respectively to suppress back feeds of voltage. The selected diodes may have an electrical current rating of 6 amps. Alternatively, a single diode bridge rated at 25 amps may be substituted.

It will be understood that several variations, as will be apparent to those skilled in this art, may be made to the above described embodiments of the invention without departing from the scope of the claims. The selection of the components comprising the brake control system according to the invention will in part, be determined by the physical size of the components and their adaptability to form part of a console which will be unobtrusive and yet will be easily accessed; by the technical requirements of providing an electrically balanced circuit; by reliability and by cost.

It will be evident to those skilled in the art that mechanical equivalents to the above described embodiments of the invention may be provided in the form of an auxiliary control system adapted to control the magnitude of the braking power in brakes operated by pneumatic solenoid valves.

While the invention has been described as an auxiliary brake control system for use with a primary brake control system so as to be adapted for the retroactive fitting of vehicles requiring emergency brake controls, it will be appreciated that the brake control system of the invention may be incorporated with a primary brake control system in a single system to thereby obviate any duplication of equivalent components, for example, the variably tapped resistor 46.

I claim:

1. In a wheeled tow vehicle and a wheeled towed vehicle combination, the towed vehicle having adjustable brakes adapted to vary a bracking force applied to the towed vehicle wheels, nd an infinitely adjustable primary brake control system for actuating said brakes, the improvement in which an auxiliary brake control system adapted for actuating said brakes and for disabling said primary brake control system is provided, the auxiliary brake control system comprising brake regulation means adapted to adjust said brakes for delivery for a pre-determined braking force to the towed vehicle wheels and at least two manually operable switch means accessible to any occupants of the tow vehicle for selection of a respective pre-determined braking force, the switch means being operatively connected to said brake regulation means to deliver the selected braking force upon actuation of the associated switch means and maintain said selected braking force without any manual intervention by an occupant of the tow vehicle.

2. In a wheeled tow vehicle and a wheeled towed vehicle combination, the towed vehicle having electrically operable brakes whereof the braking force applied to the towed vehicle wheels is proportional to the electrical current supplied to the brakes and the supply of electrical current to the brakes is controlled by an infinitely adjustable primary brake control system, the improvement in which an auxiliary brake control system adapted for actuation said brakes and for disabling said primary brake control system is provided, the auxiliary brake control system comprising a source of electrical current electrically connected to the towed vehicle brakes by at least two manually operable switch means accessible to any occupants of the tow vehicle for selection of a respective electrical circuit between the switches and the brakes and having a pre-determined electrical resistance, the switch means being adapted to keep the selected electrical circuit closed without any manual intervention by an occupant of the two vehicle.

3. Auxiliary brake control system according to claim 2 including electrical relay means adapted to supply electrical current to the towed vehicle brake lights upon actuation of one of said switch means to close a selected electrical circuit.

4. Auxiliary brake control system according to claim 2 in which the switch means is of the push on, push off type, being adapted to close a respective electrical circuit when pushed on and to open said circuit on the next successive push.

5. Auxiliary brake control system according to claim 2 in which the switches are connected to respective pre-selected locations on a variably tapped resistor connected to the brakes.

6. Auxiliary brake control system according to claim 5 in which the switches are connected to respective electrical relays electrically connected between the switches and the variably tapped resistor.

7. Auxiliary brake control system according to claim 2 in which the switches are connected to respective adjustable potentiometers electrically connected between the switches and a transistor electrically connected to the brakes.

8. Auxiliary brake control system according to claim 2 in which the electrical circuits are independent from a brake light circuit provided on the tow vehicle.

* * * * *